United States Patent [19]

Nakamura

[11] Patent Number: 4,930,747
[45] Date of Patent: Jun. 5, 1990

[54] SOLENOID VALVE ASSEMBLY

[75] Inventor: Mamoru Nakamura, Chiryu, Japan

[73] Assignee: Aisin Seiki Kabushiki Kaisha, Aichi, Japan

[21] Appl. No.: 285,984

[22] Filed: Dec. 19, 1988

[30] Foreign Application Priority Data

Dec. 18, 1987 [JP] Japan ............................ 62-192222[U]

[51] Int. Cl.$^5$ .............................................. F16K 31/06
[52] U.S. Cl. ............................ 251/129.17; 251/129.15
[58] Field of Search ........................ 251/129.15, 129.17

[56] References Cited

U.S. PATENT DOCUMENTS

| | | | |
|---|---|---|---|
| 3,575,199 | 4/1971 | Beattie | 251/129.17 X |
| 3,921,670 | 11/1975 | Clippard, Jr. et al. | 251/129.15 X |
| 4,304,391 | 12/1981 | Yamaguchi | 251/129.17 X |
| 4,674,540 | 6/1987 | Takei et al. | 251/129.15 X |
| 4,732,362 | 3/1988 | Morioka et al. | 251/129.17 |
| 4,771,808 | 9/1988 | Rodger | 251/129.17 X |
| 4,805,871 | 2/1989 | Nakamura | 251/129.17 |
| 4,832,313 | 5/1989 | Hashimoto et al. | 251/129.17 X |

Primary Examiner—John Rivell
Attorney, Agent, or Firm—Sughrue, Mion, Zinn, Macpeak & Seas

[57] ABSTRACT

A solenoid valve assembly includes a casing, a magnetic core fixed to the casing, a solenoid for supplying a magnetic flux to the magnetic core, a disk-shaped elastic supporting member fixed to the casing at an outer circumferential portion thereof, and a moving part supported on the elastic supporting member adjacent the magnetic core. The moving part includes a first member having a flanged portion located at a side facing a valve seat, a second member made of an elastic material which is in contact with the surface of the flanged portion and connected to the elastic supporting member adjacent the magnetic core and a third member made of a magnetic material and connected to the first member at an end thereof and covering an outer surface of the first member.

1 Claim, 4 Drawing Sheets

SOLENOID VALVE ASSEMBLY

BACKGROUND OF THE INVENTION

This invention relates generally to a solenoid valve assembly for controlling a valve to an opened and closed condition in accordance with the supply of electric power to a solenoid and more particularly to a solenoid valve assembly having a valve member movably supported on an elastic member such as a diaphragm.

A prior art solenoid valve assembly is disclosed in Japanese Published Patent Application No. 62(1987)-113977 published on May 25, 1987. The basic structure of the solenoid valve assembly in the application is shown in FIG. 7A. A valve member 1 for engaging and disengaging with a stationary valve seat (not shown) is inserted in a central portion of a diaphragm 2 so as to move in the direction of thickness of diaphragm 2. The valve member 1 is fixed to a moving core 3 made of a magnetic material so as to move the valve member 1 electro-magnetically. In the embodiment of FIG. 7A, the stationary valve seat is arranged on the left side of valve member 1 and the valve member 1 is engaged with the valve seat under the non-excited condition of a solenoid (not shown). Furthermore, a stationary core (not shown) made of a magnetic material is located on the right side of moving core 3 and the moving core 3 is moved in the right direction by an attracting force generated at the stationary core under the excited condition of the solenoid whereby the valve member 1 is disengaged from the valve seat.

When the solenoid is excited so as to move the valve member 1 to the opened condition, the moving core 3 moves in the direction of arrow A as shown in FIG. 7B whereby the valve member 1 is subjected to a force indicated by the arrow B which is the restoring force of diaphragm 2. Accordingly, the moving core 3 and valve member 1 are subjected to opposed forces. Consequently, in the conventional solenoid assembly, an adhesive between the moving core 3 and valve member 1 may fail, causing a separation of the core 3 and the valve 1. More specifically, in a solenoid valve assembly controlling an amount of fluid passing through a valve with duty control, the force separating the valve member 1 from moving core 3 is repeated in a short period whereby the possibility of a malfunction is very high.

Furthermore, in the prior art solenoid valve assembly disclosed in the above Japanese Published Patent Application No. 62(1987)-113977, the restoring force of diaphragm 2 increased rapidly when the moving core 3 approaches the stationary core so as to avoid the engagement of moving core 3 with the stationary core. Therefore the force separating the valve member 1 from moving core 3 is strong, whereby the possibility of a malfunction is very high in comparison with a standard solenoid valve assembly.

If the moving core is supported on the diaphragm, the possibility of separation of the moving core from the valve member will disappear. However, in such a case, the diaphragm is easy to break due to the fact that the moving core is a rigid body whereby the malfunction cannot be avoided.

SUMMARY OF THE INVENTION

The present invention has basically solved the foregoing disadvantages in the prior art. Therefore, one of the objects of the present invention is to provide a solenoid valve assembly preventing a valve, a moving core and diaphragm from malfunctioning.

To complete this object, the solenoid valve assembly is comprised of a casing, a magnetic core fixed to the casing, a solenoid for supplying a magnetic flux to the magnetic core, a membrane or disk-shaped elastic supporting member fixed to the casing at an outer circumferential portion thereof, and a moving part supported on the elastic supporting member facing the magnetic core and including a first member having a flanged portion located at an end facing a valve seat, a second member made of an elastic material contacting the first member on a surface facing the magnetic core and a third member made of magnetic material connected to the first member at an end thereof and covering an outer surface of the first member.

According to the above structure, the moving part is supported on the elastic supporting member by the second member arranged at the surface facing the magnetic core so that the connecting surface between the flanged portion of the first member and the second member receives a pushing force. Consequently, the connection between the flanged portion and the second portion is prevented from separation.

Other objects, features and advantages of the present invention will be more fully appreciated as the same becomes better understood from the following detailed description when considered in connection with the accompanying drawings.

DETAILED DESCRIPTION OF THE PREFERRED EMBODIMENTS

Figure 1:
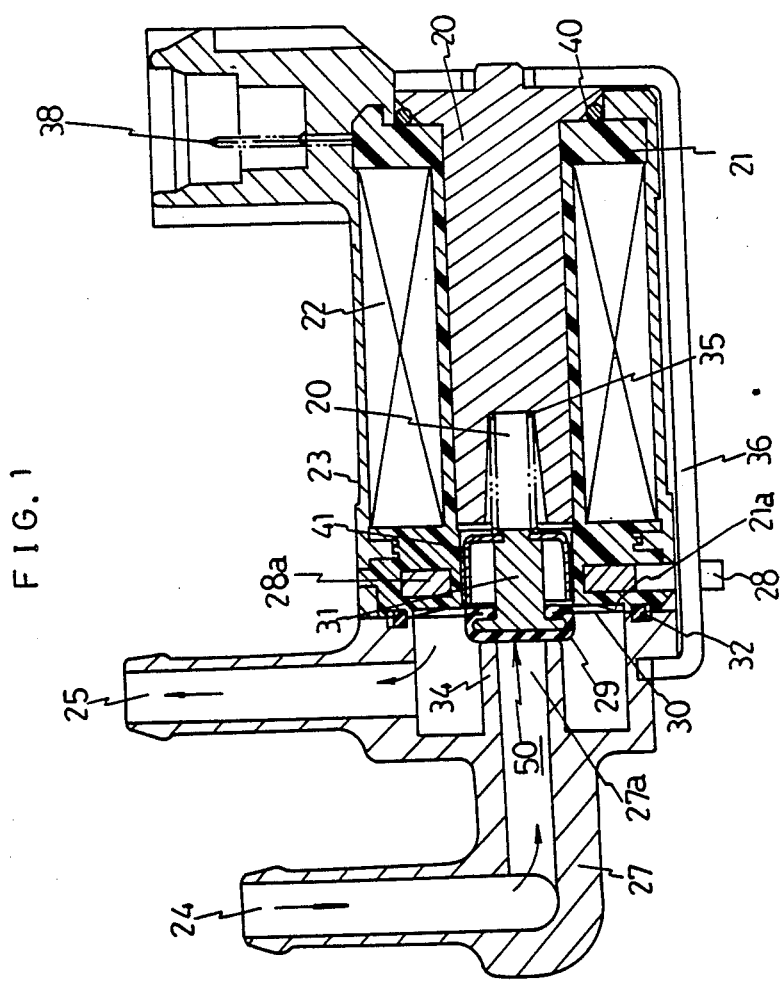
FIG. 1 is an enlarged cross-sectional view of one embodiment of the present invention.
Figure 2:
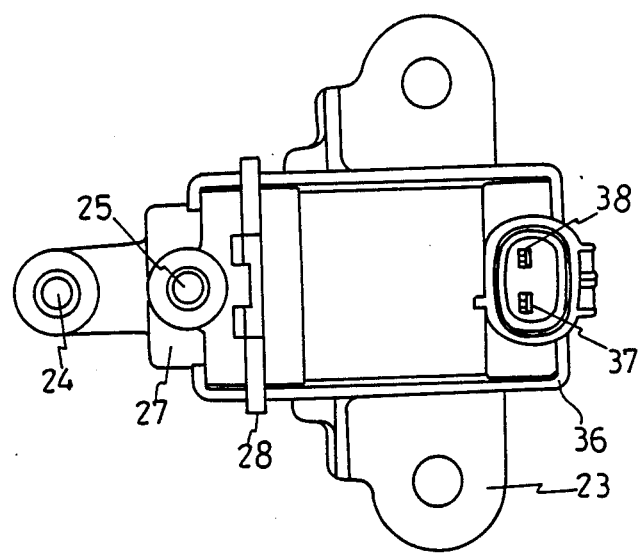
FIG. 2 is a plan view of one embodiment of the present invention.
Figure 3:
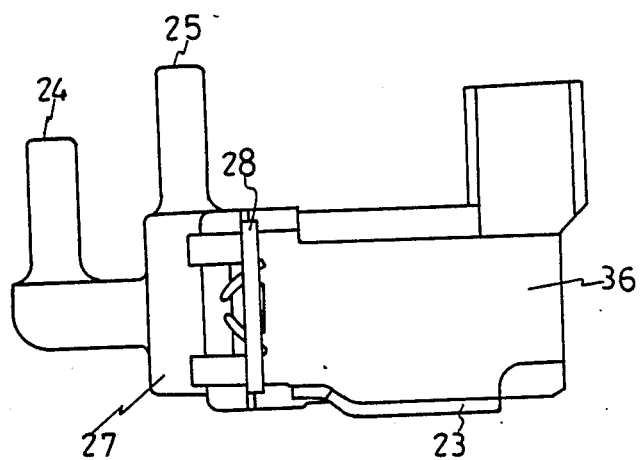
FIG. 3 is a front view of one embodiment of the present invention.

Referring to FIGS. 1, 2 and 3, a casing is comprised of parts 23 and 27 made on non-magnetic materials. As shown in FIG. 1, a stationary magnetic core 20, a bobbin 21 and a solenoid 22 are arranged in the casing 23. The solenoid 22 is wound around the bobbin 21. The bobbin 21 is made of a non-magnetic material and disposed on an outer circumferential portion of stationary magnetic core 20.

A passage 27a is formed in an inner space of casing 27 and ports 24 and 25 are in communication when the passage 27a is opened to the interior of casing 27. A moving part 50 faces a valve seat 34 formed on casing 27.

Figure 4:
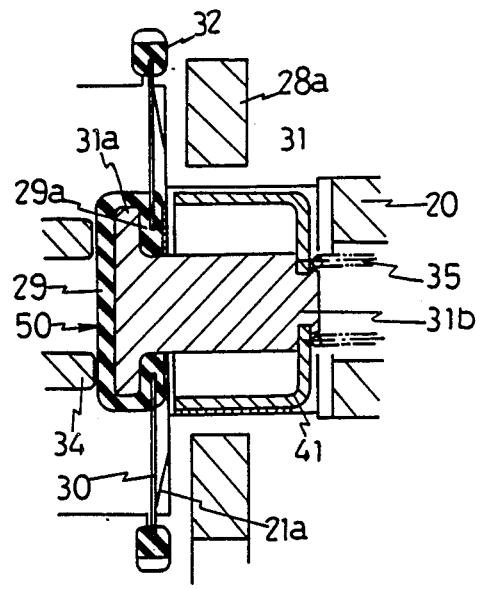
FIG. 4 is a partial enlarged view of FIG. 1.

As shown in FIG. 4, the moving part 50 is comprised of a central member 31, a covering member 29, a moving magnetic core 41 made of a magnetic material, a diaphragm or leaf spring 30 and a lip 32 which are assembled as a unit. The central member 31 is comprised of a projecting portion and a flanged portion 31a at one end thereof. The material of the central member 31 is a light-weight. material such as a plastic. The covering member 29 is made of an elastic material such as rubber and covers the whole flanged portion 31a. The diaphragm 30 is fixed to a portion 29a of covering member 29. The portion 29a is located as part of covering member 29 and faces flanged portion 31a and stationary magnetic core 20 at opposite side surfaces thereof.

Accordingly, since the moving part 50 is supported on diaphragm 30 at the portion 29a where a portion of the flanged portion 31a faces stationary core 20, separation between central member 31 and covering member 29 does not occur as a result of a force generated by attracting the moving part 50 to stationary magnetic core 20. Namely, if moving part 50 is attracted by stationary magnetic core 20, the flanged portion 31a of central member 31 receives a force toward the right in FIG. 4 and as a result, the flanged portion 31a of central member 31 and portion 29a of covering member 29 push against each other, whereby the flanged portion 31a of central member 31 and portion 29a of covering member 29 are not separated.

The diaphragm 30 is comprised of a disk-shaped metal member and has an opening 30b at a central portion thereof and a plurality of openings 30a at the outer peripheral portion thereof. The lip or edge member 32 is made of an elastic material such as rubber and is fixed to an outer peripheral portion of diaphragm 30. The central member 31, the covering member 29, the diaphragm 30 and the lip 32 are formed as a unit by insert molding.

The lip 32 supports diaphragm 30 between casings 23 and 27 and seals the passage 27a and the exterior of casing in an airtight manner.

The moving magnetic core 41 is a cup-shaped member and has an opening for engaging the central member 31 at a central portion of an end thereof. One end 31b of central member 31 is inserted into the opening of moving magnetic core 41 and then the end 31b is flattened so that the central member 31 and the moving magnetic core 41 are formed as a unit. The cup-shaped moving magnetic core 31 is advantageously lightweight and can provide a large area facing stationary magnetic core 20 and magnetic yoke 28a.

Referring to FIG. 1, the moving magnetic core 41 receives a biasing force in a direction away from stationary magnetic core 20 by a compression spring 36 disposed in a concave recess 20a formed in stationary magnetic core 20, whereby valve member 29 engages with the valve seat 34 in the non-excited condition of solenoid 22 and is maintained in a closed condition. In this embodiment, deformation of diaphragm 30 is zero when the valve member 29 engages valve seat 34.

The yokes 28a and 28 are arranged in a position facing an outer circumferential surface of the cupped portion of the moving magnetic core 41. The yoke 28 is connected to a magnetic yoke 36 connected to stationary magnetic core 20. When the solenoid 22 is excited with a certain current, magnetic flux circulates in a magnetic path formed in stationary magnetic core 20, yoke 36, yoke 28, moving magnetic core 41 and stationary magnetic core 20 whereby a magnetic attracting force is generated between stationary magnetic core 20 and moving magnetic core 41. Namely, if the solenoid 22 is excited, the moving part 50 is attracted toward the stationary magnetic core 20 against the force of spring 35 and diaphragm 30 whereby valve member 29 is disengaged from valve seat 34 and, as a result, the valve member 29 changes to the opened condition. On the other hand, if the solenoid 22 is non-excited, the valve member returns to the initial position thereof due to the biasing forces of the diaphragm 30 and the spring 35 whereby valve member 29 is engaged with valve seat 34 and, as a result, the valve member 29 changes to the closed condition.

A curved guiding surface 21a is formed on a portion of bobbin 21 facing diaphragm 30. The contacting surfaces of diaphragm 30 and guide surface 21a act as a fulcrum which is changed by surface 31a in accordance with the position of moving part 50 so as to avoid a collision of moving part 50 with stationary magnetic core 20.

The reference numerals 37 and 38 indicate terminals connected to solenoid 22. The reference numeral 40 indicates a sealing ring.

Figure 6A:
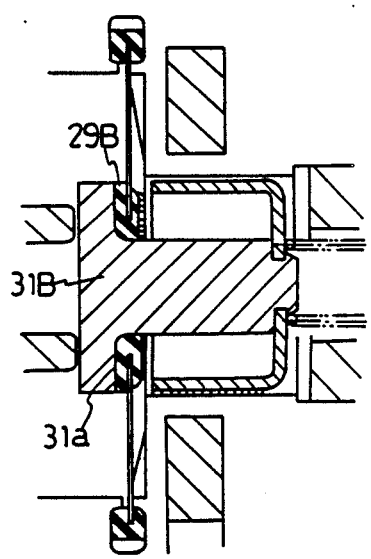
FIGS. 6A and 6B are partial enlarged views, each showing a modified embodiment of the present invention.
Figure 6B:
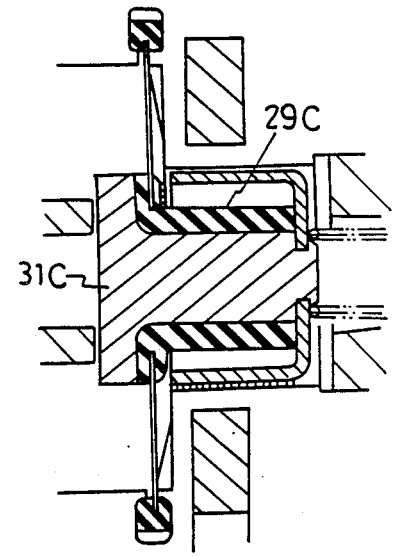
Figure 5:
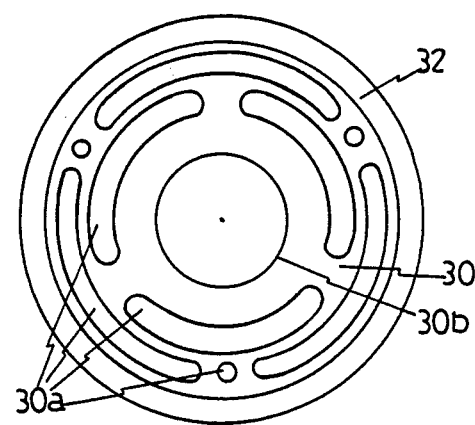
FIG. 5 is a front view of the diaphragm shown in FIG. 4.
Figure 7A:
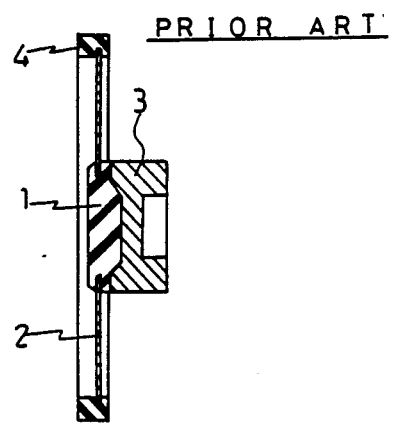
FIGS. 7A and 7B are cross-sectional views showing a conventional structure.
Figure 7B:
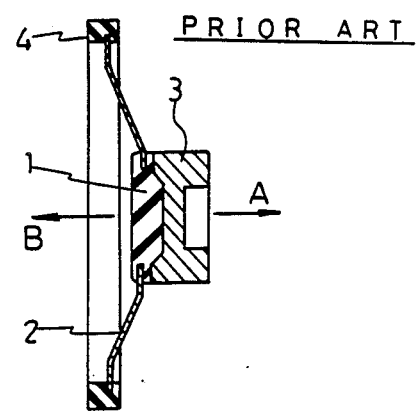

In both modified embodiments of FIGS. 6A and 6B, each covering member 29B and 29C is arranged on only a part of each central member 31B and 31C which is the side of flange portion 31a facing stationary magnetic core 20. Therefore, each of the central members 31B and 31C contact each valve seat directly as the valve member. In all the embodiments according to the present invention, a separating force between central member and covering member does not occur.

Obviously, many modifications and variations of the present invention are possible in light of above teachings. It is therefore to be understood that within the scope of the appended claims the invention may be practiced otherwise than as specifically described herein.

What is claimed is:

1. A solenoid valve assembly comprising;
   a casing;
   a magnetic core fixed to said casing;
   a solenoid for supplying a magnetic flux to said magnetic core disposed about said magnetic core;
   a disk-shaped elastic supporting member fixed to said casing at an outer circumferential portion thereof; and
   a moving part supported on said elastic supporting member between a valve seat and the magnetic core and including a first member having a flanged portion located at a side facing said valve seat, a second member made of an elastic material disposed in contact with said flanged portion on the side thereof facing said core and said elastic supporting member and a third member made of a magnetic material connected to said first member at an end thereof adjacent said core and covering an outer surface of said first member, said third member having a hollow cup-shaped configuration with an opening in a bottom central portion thereof engaging said end of said first member.

* * * * *